(12) United States Patent
Mao et al.

(10) Patent No.: US 11,109,038 B2
(45) Date of Patent: Aug. 31, 2021

(54) INTRA-CODED FRAME RATE ALLOCATION METHOD, COMPUTER DEVICE AND STORAGE MEDIUM (71) Applicant: TENCENT TECHNOLOGY (SHENZHEN) COMPANY LTD, Guangdong (CN)

(72) Inventors: Xu Nan Mao, Shenzhen (CN); Yao Yao Guo, Shenzhen (CN); Li Cai Guo, Shenzhen (CN); Yong Fang Shi, Shenzhen (CN); An Lin Gao, Shenzhen (CN); Haibo Deng, Shenzhen (CN); Chen Chen Gu, Shenzhen (CN); Jing Lv, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 49 days.

(21) Appl. No.: 16/395,471

(22) Filed: Apr. 26, 2019

(65) Prior Publication Data
US 2019/0253718 A1 Aug. 15, 2019

Related U.S. Application Data (63) Continuation of application No. PCT/CN2018/077993, filed on Mar. 5, 2018.

(30) Foreign Application Priority Data

Mar. 7, 2017 (CN) .......................... 201710132526.9

(51) Int. Cl.
H04N 19/159 (2014.01)
H04N 19/184 (2014.01)
(Continued)

(52) U.S. Cl.
CPC ........... *H04N 19/159* (2014.11); *H04N 19/11* (2014.11); *H04N 19/146* (2014.11);
(Continued)

(58) Field of Classification Search
None
See application file for complete search history.

(56) References Cited

U.S. PATENT DOCUMENTS 10,212,451 B2 * 2/2019 Zhu ...................... H04N 19/567
2006/0203907 A1 * 9/2006 Yang .................... H04N 19/124
375/240.03
(Continued)

FOREIGN PATENT DOCUMENTS

CN 1109268 A 9/1995
CN 10-2009-0043982 A 5/2009
(Continued)

OTHER PUBLICATIONS

Communication dated Jun. 29, 2020, by the Japanese Patent Office in application No. 2019-529916.
(Continued)

*Primary Examiner* — Dave Czekaj
*Assistant Examiner* — Shanika M Brumfield
(74) *Attorney, Agent, or Firm* — Sughrue Mion, PLLC (57) ABSTRACT An intra frame bit rate allocation method being performed by a computer device comprising at least one processor, includes when a current frame of picture is an intra frame in a specified frame sequence, pre-encoding the current frame of picture; calculating a corresponding intra frame encoding cost and an inter frame encoding cost of the pre-encoding; and allocating an intra frame bit rate according to the calculated intra frame encoding cost and the inter frame encoding cost.

16 Claims, 7 Drawing Sheets (51) Int. Cl.
*H04N 19/166* (2014.01)
*H04N 19/146* (2014.01)
*H04N 19/11* (2014.01)
*H04N 19/177* (2014.01)

(52) U.S. Cl.
CPC ......... *H04N 19/166* (2014.11); *H04N 19/177* (2014.11); *H04N 19/184* (2014.11)

(56) References Cited

U.S. PATENT DOCUMENTS

| | | | |
|---|---|---|---|
| 2008/0025396 A1 | 1/2008 | Tasaka et al. | |
| 2008/0304562 A1* | 12/2008 | Chang | H04N 19/124 375/240.03 |
| 2011/0002385 A1* | 1/2011 | Kobayashi | H04N 19/61 375/240.13 |
| 2011/0142125 A1* | 6/2011 | Tripathi | H04N 19/124 375/240.03 |
| 2011/0150094 A1* | 6/2011 | Wang | H04N 19/194 375/240.16 |
| 2015/0010073 A1* | 1/2015 | Ducloux | H04N 19/63 375/240.12 |
| 2017/0070555 A1* | 3/2017 | Frello | H04N 19/11 |

FOREIGN PATENT DOCUMENTS

| | | |
|---|---|---|
| CN | 103237210 A | 8/2013 |
| CN | 104717515 A | 6/2015 |
| CN | 106961603 A | 7/2017 |
| EP | 0 899 961 A1 | 3/1999 |
| GB | 2540242 A | 1/2017 |
| JP | 4-175085 A | 6/1992 |
| JP | 2008-35134 A | 2/2008 |

OTHER PUBLICATIONS

Written Opinion dated May 25, 2018 from the International Bureau in International Application No. PCT/CN2018/077993.
Lin Sun, et al., "Rate Distortion Modeling and Adaptive Rate Control Scheme for High Efficiency Video Coding (HEVC)", IEEE International Symposium on Circuits and Systems (ISCAS), Jun. 5, 2014.
International Search Report for PCT/CN2018/077993 dated May 25, 2018 [PCT/ISA/210].
Chinese Office Action 2017101325269 dated Feb. 24, 2018.
Chinese Office Action PCT/CN2018/077993 dated May 25, 2018.
Communication dated Dec. 22, 2020 from the Korean Intellectual Property Office in KR Application No. 10-2019-7013493.
Office Action dated Jan. 18, 2021 in European Application No. 18763703.8.
Communication dated May 5, 2021, issued by the Intellectual Property Office of India in application No. 201947015952.

\* cited by examiner

INTRA-CODED FRAME RATE ALLOCATION METHOD, COMPUTER DEVICE AND STORAGE MEDIUM

CROSS-REFERENCE TO RELATED APPLICATIONS

This application is a continuation of International Patent Application No. PCT/CN2018/077993 filed on Mar. 5, 2018, which claims priority from Chinese Patent Application No. 201710132526.9, entitled "INTRA FRAME BIT RATE ALLOCATION METHOD AND APPARATUS," and filed in the State Intellectual Property Office of the People's Republic of China on Mar. 7, 2017, which are incorporated herein by reference in their entireties.

BACKGROUND

1. Field

Methods and apparatuses consistent with embodiments relate to the field of picture processing technologies, and, in particular, to an intra frame bit rate allocation method, a computer device, and a storage medium.

2. Description of Related Art

Bit rate control is control on an output stream (e.g., during video communication, such as, video calls, or streaming media transmission, such as, streaming video/audio movies/shows), so that the output stream satisfies channel bandwidth and buffer constraints. With bit rate control on the output stream, distortion of video quality may be ensured to be reduced to be as minimal as possible. The bit rate control may include two steps: a first step of allocating a bit rate, and a second step of calculating a quantization parameter. Further, an encoder may perform encoding according to the assigned bit rate and the calculated quantization parameter.

A bit rate control unit may be used to control a group of pictures (GOP). A GOP may include an I frame (an intra frame), and remaining frames that are inter frames (a P/B frame). The I frame may be the first frame of a sequence of the GOP. The I frame may be used as a basic frame, the P frame may be predicted by using the I frame, and then the B frame may be predicted by using the I frame and the P frame.

If a current frame is an I frame, a bit rate may be assigned to the current I frame according to bit rates and quantization parameters of an I frame, a P frame, and a B frame in a previous sequence, and an occupation status of a current buffer. In an actual, practical application, if a time interval between I frames is relatively large (for example, the time interval is greater than 2 seconds) because the time interval between a previous I frame and a current I frame is relatively large, a scene change is extremely likely to occur between the previous I frame and the subsequent P frame and B frame. Thus, with this relatively large time interval between I frames, a bit rate cannot be accurately assigned to the current frame by comparing bit rates and quantization parameters of the P/B frame in the previous sequence and the I frame. Consequently, picture quality of video encoding is degraded.

SUMMARY

According to embodiments, an intra frame bit rate allocation method, and corresponding computer device, and storage medium are provided.

An intra frame bit rate allocation method may be performed by a computer device comprising at least one processor, the method may include: when a current frame of picture is an intra frame in a specified frame sequence, pre-encoding, by the computer device, the current frame of picture, the pre-encoding comprising encoding the current frame of picture as an intra frame and encoding the current frame of picture as an inter frame; calculating, by the computer device, a corresponding intra frame encoding cost and an inter frame encoding cost of the pre-encoding; and allocating, by the computer device, an intra frame bit rate according to the calculated intra frame encoding cost and the inter frame encoding cost, the assigned intra frame bit rate being positively correlated with the calculated intra frame encoding cost and the inter frame encoding cost, respectively.

A computer device including at least one memory configured to store computer program code, and at least one processor configured to access the at least one memory and operate according to the computer program code. The computer program code may include pre-encoding code configured to cause the at least one processor to, when a current frame of picture is an intra frame in a specified frame sequence, pre-encode the current frame of picture, the pre-encoding comprising encoding the current frame of picture as an intra frame and encoding the current frame of picture as an inter frame; cost calculating code configured to cause the at least one processor to, calculate a corresponding intra frame encoding cost and an inter frame encoding cost of the pre-encoding; and allocating code configured to cause the at least one processor to, allocate an intra frame bit rate according to the calculated intra frame encoding cost and the inter frame encoding cost, the assigned intra frame bit rate being positively correlated with the calculated intra frame encoding cost and the inter frame encoding cost, respectively.

A non-transitory computer-readable storage medium storing instructions that may cause at least one processor to: when a current frame of picture is an intra frame in a specified frame sequence, pre-encode the current frame of picture, the pre-encoding comprising encoding the current frame of picture as an intra frame and encoding the current frame of picture as an inter frame; calculate a corresponding intra frame encoding cost and an inter frame encoding cost of the pre-encoding; and allocate an intra frame bit rate according to the calculated intra frame encoding cost and the inter frame encoding cost, the assigned intra frame bit rate being positively correlated with the calculated intra frame encoding cost and the inter frame encoding cost, respectively.

The calculating the intra frame encoding cost and inter frame encoding cost of the pre-encoding may further comprise: obtaining the intra frame encoding cost by encoding the current frame of picture as the intra frame and obtaining the inter frame encoding cost by encoding the current frame of picture as the inter frame.

The calculating the corresponding intra frame encoding cost and the inter frame encoding cost of the pre-encoding may further comprise: calculating the corresponding intra frame encoding cost or the inter frame encoding cost according to a formula: $cost=D+\lambda R$, where cost is the encoding cost, D indicates a distortion degree of a picture encoding block corresponding to an encoding unit, D may be obtained by using an absolute difference and a sum of absolute difference (SAD) operation, $\lambda$ is a Lagrange constant, and R indicates a quantity of bits occupied by the picture encoding block corresponding to the encoding unit.

The method, which may be implemented in the program code or instructions, may further comprise: calculating an intra/inter frame encoding cost ratio of the current frame of picture, the intra/inter frame encoding cost ratio being a ratio of the intra frame encoding cost to the inter frame encoding cost of the current frame of picture; and determining an intra/inter frame target bit rate ratio according to the intra/inter frame encoding cost ratio, the intra/inter frame target bit rate ratio being a ratio of a preset intra frame target bit rate to a preset inter frame target bit rate, and the intra/inter frame target bit rate ratio being positively correlated with the intra/inter frame encoding cost ratio.

The determining of the intra/inter frame target bit rate ratio according to the intra/inter frame encoding cost ratio may further comprise: comparing the intra/inter frame encoding cost ratio with each preset threshold of a plurality of thresholds, and determining a threshold time interval corresponding to the intra/inter frame encoding cost ratio; and determining, according to the corresponding threshold time interval, the intra/inter frame target bit rate ratio corresponding to the intra/inter frame encoding cost ratio, the intra/inter frame target bit rate ratio being positively correlated with the intra/inter frame encoding cost ratio.

The allocating of the intra frame bit rate may further comprise: obtaining a total target bit rate; and allocating the intra frame bit rate according to one or more of: the obtained total target bit rate, the determined intra/inter frame target bit rate ratio, a preset quantity of intra frames, and a preset quantity of inter frames.

The obtaining of the total target bit rate may further comprise obtaining a video frame rate; and obtaining the total target bit rate through calculation according to the video frame rate, a preset target bit rate per second, and a preset quantity of frames.

The allocating of the intra frame bit rate according to one or more of: the obtained total target bit rate, the determined intra/inter frame target bit rate ratio, the preset quantity of intra frames, or the preset quantity of inter frames may further comprise: calculating the intra frame bit rate according to the formula of $$Target_I = \frac{Size * C}{Num_I * C + Num_P}$$

where Size is the total target bit rate of the current bit rate control unit, $Num_I$ is the quantity of intra frames, $Num_P$ is the quantity of inter frames, and C is the intra/inter frame target bit rate ratio.

The method, which may be implemented in the program code or instructions, may further comprise performing downsampling processing on a video picture with original resolution, wherein the pre-encoding includes pre-encoding the current frame of picture obtained through the downsampling processing.

An intra frame bit rate allocation method may be performed by a computer device comprising at least one processor, the method may include based on a current frame of picture being an intra frame in a specified frame sequence, pre-encoding, by the computer device, the current frame of picture, the pre-encoding comprising encoding the current frame of picture as an intra frame, calculating, by the computer device, a corresponding pre-encoding cost of the pre-encoding, and allocating, by the computer device, an intra frame bit rate according to the calculated pre-encoding cost, the assigned intra frame bit rate being positively correlated with the calculated pre-encoding cost.

A computer device including at least one memory configured to store computer program code, and at least one processor configured to access the at least one memory and operate according to the computer program code. The computer program code may include pre-encoding code configured to cause the at least one processor to, based on a current frame of picture being an intra frame in a specified frame sequence, pre-encode the current frame of picture, the pre-encoding comprising encoding the current frame of picture as an intra frame, cost calculating code configured to cause the at least one processor to, calculate a corresponding pre-encoding cost of the pre-encoding and allocating code configured to cause the at least one processor to, assign an intra frame bit rate according to the calculated pre-encoding cost, the assigned intra frame bit rate being positively correlated with the calculated pre-encoding cost.

A non-transitory computer-readable storage medium storing instructions that may cause at least one processor to: based on a current frame of picture being an intra frame in a specified frame sequence, pre-encode the current frame of picture, the pre-encoding comprising encoding the current frame of picture as an intra frame, calculate a corresponding pre-encoding cost of the pre-encoding, and assign an intra frame bit rate according to the calculated pre-encoding cost, the assigned intra frame bit rate being positively correlated with the calculated pre-encoding cost.

The pre-encoding of the current frame of picture may further comprise encoding the current frame of picture as an inter frame. The calculating the pre-encoding cost may further comprise obtaining an intra frame encoding cost by encoding the current frame of picture as the intra frame and obtaining an inter frame encoding cost obtained by encoding the current frame of picture as the inter frame. The allocating, by the computer device, the intra frame bit rate according to the pre-encoding cost may comprise: calculating, by the computer device, an intra/inter frame encoding cost ratio of the current frame of picture, the intra/inter frame encoding cost ratio being a ratio of the intra frame encoding cost to the inter frame encoding cost of the current frame of picture, determining, by the computer device, an intra/inter frame target bit rate ratio according to the intra/inter frame encoding cost ratio, the intra/inter frame target bit rate ratio being a ratio of an intra frame target bit rate to an inter frame target bit rate, and the intra/inter frame target bit rate ratio being positively correlated with the intra/inter frame encoding cost ratio, obtaining, by the computer device, a total target bit rate, and allocating, by the computer device, the intra frame bit rate according to the obtained total target bit rate, the determined intra/inter frame target bit rate ratio, a preset quantity of intra frames, and a preset quantity of inter frames.

In an embodiment, the determining, by the computer device, the intra/inter frame target bit rate ratio according to the intra/inter frame encoding cost ratio may comprises comparing, by the computer device, the intra/inter frame encoding cost ratio with each preset threshold, and determining a threshold interval corresponding to the intra/inter frame encoding cost ratio; and determining, by the computer device, according to the corresponding threshold interval, the intra/inter frame target bit rate ratio corresponding to the intra/inter frame encoding cost ratio, the intra/inter frame target bit rate ratio being positively correlated with the intra/inter frame encoding cost ratio.

In an embodiment, the method may further comprise performing, by the computer device, downsampling processing on a video picture with original resolution. The pre-encoding may be pre-encoding the current frame of picture obtained through the downsampling processing.

In an embodiment, the obtaining, by the computer device, the total target bit rate may comprise: obtaining, by the computer device, a video frame rate and obtaining, by the computer device, the total target bit rate through calculation according to the video frame rate, a preset target bit rate per second, and a preset quantity of frames.

In an embodiment, the method may further include performing encoding according to the assigned intra frame bit rate.

Details of embodiments are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the disclosed embodiments of this application more clearly, the following briefly describes the accompanying drawings for describing the embodiments. The accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. The specific embodiments described herein are merely used for explaining this application but are not intended to limit this application.

Figure 1:
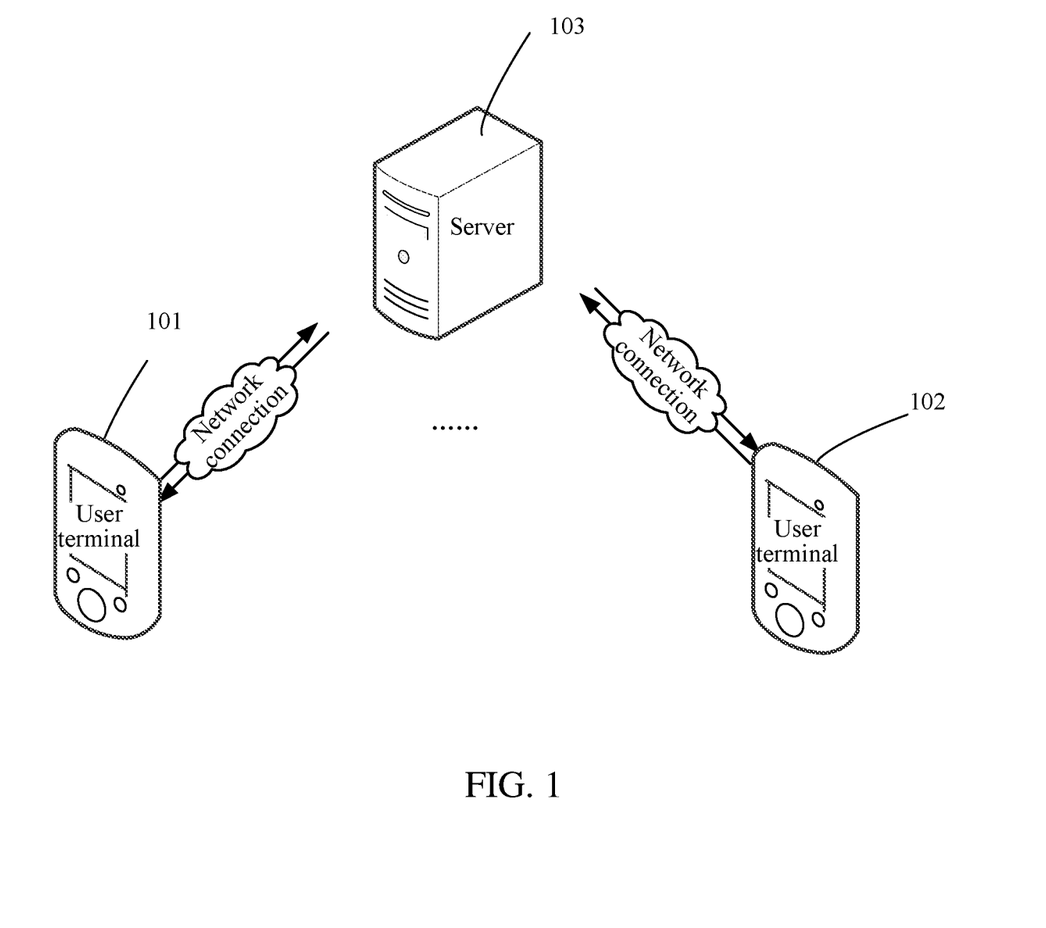
FIG. 1 is a schematic diagram of an application environment of an intra frame bit rate allocation method according to an embodiment.

FIG. 1 is a schematic diagram of an application environment of an intra frame bit rate allocation method according to an embodiment. As shown in FIG. 1, the application environment may be a system that includes a first computer device 101, a second computer device 102, and a third computer device 103. The first computer device 101 and the second computer device 102 may have separate network connections with the third computer device 103 as shown by the cloud bubbles entitled "Network Connection" in FIG. 1. The first computer device 101 and the second computer device 102 may be user terminals, and the third computer device 103 may be a server. The first computer device 101 and the second computer device 102 may respectively run video communication application programs. For example, a first user may capture video data by using a camera of the first computer device 101 and transmit the captured video data to the second computer device 102 by using the third computer device 103, so that a second user may view the video data captured by the camera of the first computer device 101 by using the second computer device 102. Similarly, the first user may view, by using the first computer device 101, video information captured or collected by the second computer device 102, to implement video communication between the first user and the second user. Video communication may be referred to as video chat or a video call. Although the embodiment discussed above shows that the video data may be captured by one or more of the computer devices 101 or 103, the video data may be collected by another method besides being captured by a camera.

In an embodiment, an intra frame bit rate allocation method may be run on the first computer device 101 or the second computer device 102. Using the first computer device 101 as an example, the first computer device may collect picture data, pre-encode a current frame of picture when the current frame of picture is an intra frame in a specified frame sequence, the pre-encoding may include encoding the current frame of picture into an intra frame. Further, the first computer device 101 may calculate a corresponding pre-encoding cost and assign an intra frame bit rate according to the pre-encoding cost. An encoder may perform encoding according to the assigned intra frame bit rate and a calculated quantization parameter. The intra frame bit rate assigned according to the pre-encoding cost may be positively correlated with the pre-encoding cost. The assigned bit rate can reflect an actual scenario of a picture of the current frame of picture without being affected by bit rates and quantization parameters of a previous sequence GOP, so that accuracy of the assigned intra frame bit rate is high, thereby improving picture quality of video encoding.

In another application scenario, alternatively, only the first computer device 101 and the third computer device 103 may be included. The first computer device 101 and the third computer device 103 may have a network connection. The first computer device 101 may transmit the collected video data to the third computer device 103. The intra frame bit rate allocation method may run on the first computer device 101.

In another embodiment, the first user may alternatively send a streaming media file to the second computer device 102 by using the first computer device 101. In this embodiment, the intra frame bit rate allocation method may be run on the third computer device 103. The third computer device 103 may, for example, decode and then re-encode a video stream sent by the first computer device 101, and then transmit the re-encoded video stream to the second computer device 102, to satisfy play requirements of different terminal platforms.

In another application scenario, alternatively, only the first computer device 101 and the third computer device 103 may be included. The first computer device 101 and the third computer device 103 are in a network connection. The first computer device 101 may transmit a streaming media file to the third computer device 103. The intra frame bit rate allocation method may be run on the third computer device 103.

Figure 2:
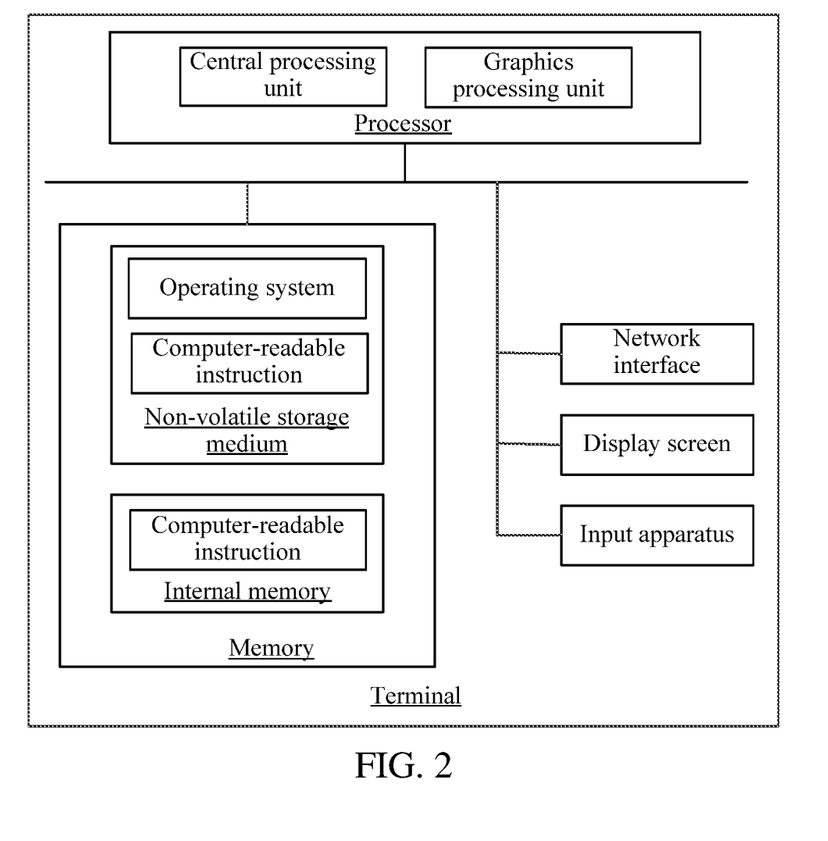
FIG. 2 is a schematic diagram of an inner structure of a computer device according to an embodiment.

FIG. 2 is a schematic diagram of an inner structure of a computer device, such as computer device 101 or 102, according to an embodiment. As shown in FIG. 2, the computer device may include one or more of: a processor, a memory, a network communication interface (e.g., a Network Interface Controller, a modem and the like), a display (e.g., a display screen or a projector), a camera, and an input apparatus that are connected by using a system bus. The Network Interface Controller may also be known as a network interface card (NIC), network adapter, LAN adapter or physical network interface, and by similar terms. The processor may be a hardware processor that includes at least one of: a central processing unit (CPU) and/or a graphics processing unit (GPU). The memory may include one or more memories that include one or more non-volatile storage medium(s) and one or more internal memory, which may be referred to simply as a medium or memory, respectively. The non-volatile storage medium of the computer device may store an operating system and computer-readable instructions. When the computer-readable instructions are executed, the processor may be caused to perform an intra frame bit rate allocation method. The processor of the computer device may include one or more processors configured to provide calculation and control capabilities, to support operation of the entire computer device. The network interface of the computer device may be configured to perform network communication with a server, such as, the third computer device 103. For example, the network interface of the computer device may transmit a video file to the server and receive a video file that is from another computer device and that is sent by the server. The display of the computer device may be one of: a display screen, such as, liquid crystal display screen, or an e-ink display screen, or the like or a projector. The input apparatus may include one or more of: a touch layer covering the display screen, a button, a trackball, a touchpad disposed on a housing of the computer device, an external keyboard, a touchpad, or a mouse or the like. The computer device may be a mobile phone, a tablet computer, a personal digital assistant, a wearable device, or the like. A person skilled in the art understands that, the structure shown in FIG. 2 is merely a block diagram of a partial structure related to an embodiment in this application and does not constitute a limitation to the computer device to which the solution in this application is applied. Specifically, the computer device may include more components or fewer components than those shown in the figure, or some components may be combined, or a different component deployment may be used.

Figure 3:
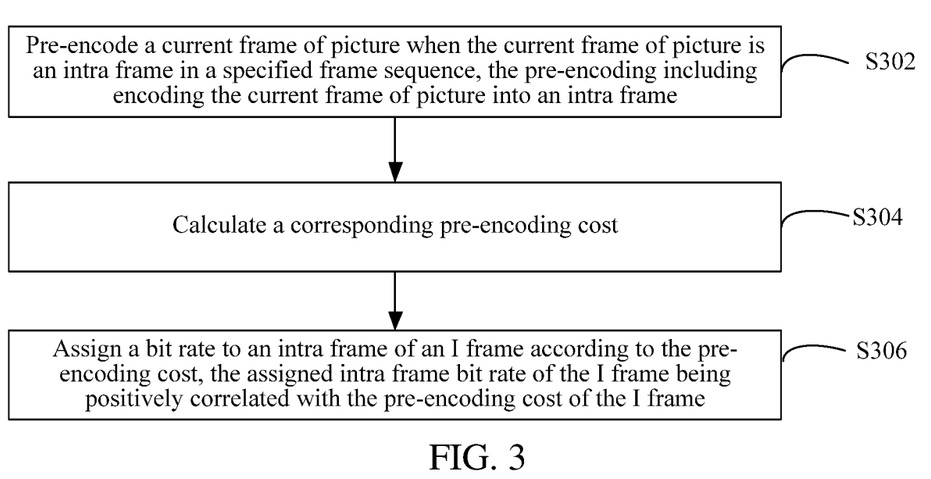
FIG. 3 is a schematic flowchart of an intra frame bit rate allocation method according to an embodiment.

FIG. 3 is a schematic flowchart of an intra frame bit rate allocation method according to an embodiment. In this embodiment, as an example, the method could be applied to the first computer device 101 in FIG. 1. Referring to FIG. 3, the method specifically may include one or more of the following steps S302, S304 and S306.

S302: Pre-encode a current frame of picture when the current frame of picture is an intra frame in a specified frame sequence, the pre-encoding including encoding the current frame of picture into an intra frame.

The intra frame is an I frame, which may be an independent frame with all information and may be independently decoded without referring to another picture. The I frame may be simply understood as a static picture. In this embodiment, a frame sequence order is preset for an encoder. For example, a group of pictures (GOP) may be set to include 12 frames, and a frame sequence in the GOP may be, for example, IBBPBBPBIBBP. When receiving each frame of picture, a bit rate control unit of a processor may determine, according to the preset frame sequence order, whether the current frame of picture is the intra frame in the specified frame sequence. When it is determined that the current frame of picture is the intra frame in the specified frame sequence, the current frame of picture may be pre-encoded.

The pre-encoding in this embodiment may include encoding the current frame of picture into the intra frame. In a specific embodiment, a pre-encoding process may be the same as an actual encoding process. In another implementation, the pre-encoding may alternatively simplify an encoding module and improve an encoding speed. For example, an encoding mode selection may be simplified. For example, an optimal mode may be selected from nine encoding modes (e.g., in an HEVC mode, when encoding is performed in a normal frame, an optimal mode needs to be selected from 35 encoding modes).

S304: Calculate a corresponding pre-encoding cost.

Specifically, a formula for calculating the pre-encoding cost may be: cost=D+λR, where cost is the encoding cost, D may indicate a distortion degree of a picture encoding block corresponding to an encoding unit, D may be obtained by using an absolute difference and a sum of absolute difference (SAD) operation, λ may be a Lagrange constant, and R may indicate a quantity of bits occupied by the picture encoding block corresponding to the encoding unit. In another implementation, the encoding cost may alternatively be indicated by using only D, that is, cost=D. In another implementation, the encoding cost may alternatively be estimated according to a prediction residual.

S306: Assign an intra frame bit rate according to the pre-encoding cost, the assigned intra frame bit rate being positively correlated with the pre-encoding cost.

In this embodiment, the assigned intra frame bit rate is positively correlated with the pre-encoding cost. That is, a higher pre-encoding cost may indicate a higher assigned intra frame bit rate, and a lower pre-encoding cost may indicate a lower intra frame bit rate.

In the foregoing intra frame bit rate allocation method, the pre-encoding cost may be obtained by pre-encoding the current frame of picture, and the pre-encoding may include encoding the current frame of picture into the intra frame. If the pre-encoding cost is high, it indicates that a bit rate required by the intra frame for reaching same video quality is high, or if the pre-encoding cost is low, it indicates that a bit rate required by the intra frame bit rate for reaching same video quality is low. Therefore, the intra frame bit rate assigned according to the pre-encoding cost can reflect an actual scenario of a picture of the current frame of picture without being affected by bit rates and quantization parameters of a previous sequence GOP, so that accuracy of the assigned intra frame bit rate is high, thereby improving picture quality of video encoding.

Figure 4:
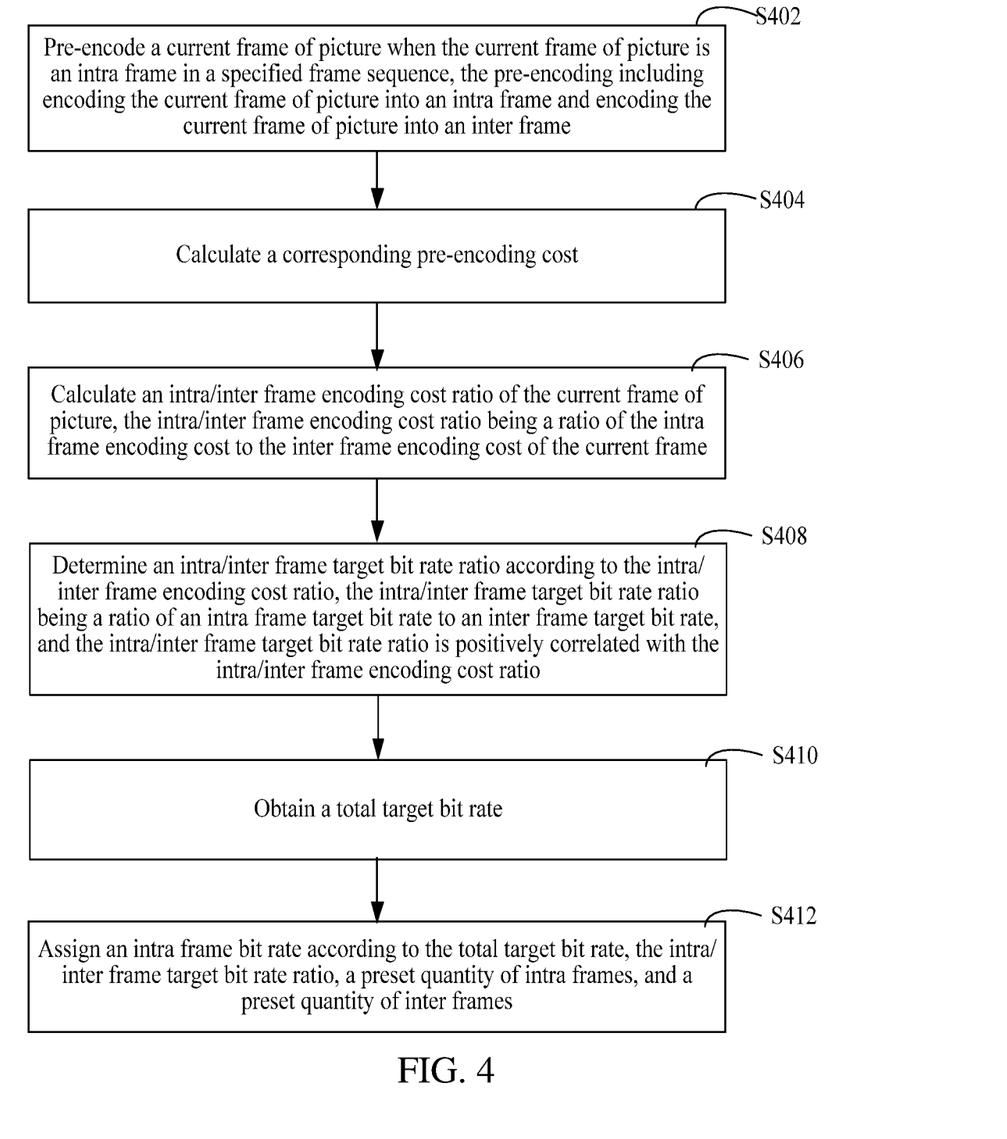
FIG. 4 is a schematic flowchart of an intra frame bit rate allocation method according to another embodiment.

FIG. 4 is a schematic flowchart of an intra frame bit rate allocation method according to another embodiment. As shown in FIG. 4, the method may include one or more of the followings steps: S402, S404, S406, S408, S410 and S412.

S402: Pre-encode a current frame of picture when the current frame of picture is an intra frame in a specified frame sequence, the pre-encoding may include encoding the current frame of picture into an intra frame and encoding the current frame of picture into an inter frame.

The intra frame is an I frame, which is an independent frame with all information and may be independently decoded without referring to another picture. The I frame may be simply understood as a static picture. In this embodiment, a frame sequence order may be preset for an encoder. For example, a group of pictures (GOP) may be set to include 12 frames, and a frame sequence in the GOP may be IBBPBBPBIBBP. When receiving each frame of picture, a bit rate control unit may determine, according to the preset frame sequence order, whether the current frame of picture is the intra frame in the specified frame sequence. When it is determined that the current frame of picture is the intra frame in the specified frame sequence, the current frame of picture may be pre-encoded.

Specifically, when the current frame of picture is a set intra-frame encoded frame (a specified intra frame), it may be separately assumed that the current frame of picture is an intra frame image and an inter-coded frame and the current frame image may be encoded as an intra-coded frame and an inter-coded frame by using a corresponding coding manner. The current frame of picture may be encoded into the intra frame and the inter frame in corresponding encoding manners.

A pre-encoding process is the same as an actual encoding process. In another implementation, the pre-encoding may alternatively simplify an encoding module and improve an encoding speed. For example, an encoding mode selection is simplified. An optimal mode may be selected from nine encoding modes (in an HEVC mode, when encoding is performed in a normal frame, an optimal mode may need to be selected from 35 encoding modes).

S404: Calculate a corresponding pre-encoding cost.

Specifically, an intra frame encoding cost may be obtained by encoding the current frame of picture into the intra frame and an inter frame encoding cost obtained by encoding the current frame of picture into the inter frame such that the intra frame encoding cost and the inter frame encoding cost are separately calculated.

A formula for calculating the corresponding pre-encoding cost may be: cost=D+λR, where cost is the encoding cost, D indicates a distortion degree of a picture encoding block corresponding to an encoding unit, D may be obtained by using an absolute difference and a sum of absolute difference (SAD) operation, λ is a Lagrange constant, and R indicates a quantity of bits occupied by the picture encoding block corresponding to the encoding unit. In another implementation, the encoding cost may alternatively be indicated by using only D, that is, cost=D. In another embodiment, the encoding cost may alternatively be estimated according to a prediction residual.

A higher intra frame encoding cost obtained through calculation may indicate a higher bit rate that is required for reaching a same video quality, if the current frame of picture is the intra frame. Otherwise, lower intra frame encoding cost obtained through calculation may indicate a lower bit rate that is required for reaching the same video quality, if the current frame of picture is the intra frame.

Higher inter frame encoding cost obtained through calculation may indicate a higher bit rate that is required for reaching a same video quality, if the current frame of picture is the inter frame. Otherwise, lower inter frame encoding cost obtained through calculation may indicate a lower bit rate that is required for reaching a same video quality, if the current frame of picture is the inter frame.

S406: Calculate an intra/inter frame encoding cost ratio of the current frame of picture, the intra/inter frame encoding cost ratio being a ratio of the intra frame encoding cost to the inter frame encoding cost of the current frame.

Generally, if motions in a video are intense and a correlation between pictures is relatively small, to reach video quality, a bit rate required by the inter frame is relatively high. Otherwise, for a relatively static video, a bit rate required by the inter frame is relatively low.

The intra/inter frame encoding cost ratio of the current frame of picture may be analyzed. The ratio is equal to the intra frame encoding cost divided by the inter frame encoding cost. If the intra/inter frame encoding cost ratio is low, it indicates that the inter frame needs a higher bit rate, so that in a same target bit rate, a relatively low bit rate may be assigned to the intra frame. Otherwise, if the intra/inter frame encoding cost ratio is high, a relatively high bit rate may be assigned to the intra frame. The intra frame encoding cost may be denoted as I cos t, the inter frame encoding cost may be denoted as P cos t, and the ratio of the intra frame encoding cost to the inter frame encoding cost may be denoted as IP cos t, so that the formula may be expressed as:

$$IP\text{cos}t = \frac{I\text{cos}t}{P\text{cos}t}.$$

S408: Determine an intra/inter frame target bit rate ratio according to the intra/inter frame encoding cost ratio, the intra/inter frame target bit rate ratio being a ratio of a preset intra frame target bit rate to a preset inter frame target bit rate, and the intra/inter frame target bit rate ratio being positively correlated with the intra/inter frame encoding cost ratio. In this embodiment, the preset intra frame target bit rate and the preset inter frame target bit rate may be adjusted in correspondence to the actual consumed bit rate of the already encoded frame, to fit for the preset requirements of an entire video target bit rate and per second average bit rate.

The intra/inter frame target bit rate ratio is the ratio of the intra frame target bit rate to the inter frame target bit rate. The intra/inter frame target bit rate ratio may be positively correlated with the intra/inter frame encoding cost ratio. That is, a higher intra/inter frame encoding cost ratio indicates a higher intra/inter frame target bit rate ratio, and a lower intra/inter frame encoding cost ratio indicates a lower intra/inter frame target bit rate ratio.

The intra/inter frame target bit rate ratio may be denoted as C. Therefore, a higher IP cos t may indicate a higher C. Otherwise, a lower IP cos t may indicate a lower C.

S410: Obtain a total target bit rate.

Specifically, a method for calculating the total target bit rate of the current bit rate control unit includes the following steps: obtaining a video frame rate, and obtaining the total target bit rate through calculation according to the video frame rate, a preset target bit rate per second, and a preset quantity of frames.

The frame rate may be a metric used for measuring a quantity of displayed frames, that is, a quantity of pictures per second. The frame rate may be determined through video sampling. The target bit rate per second and the quantity of frames may be preset. The total target bit rate of the current bit rate control unit may be equal to the target bit rate per second divided by the frame rate and then multiplied by the quantity of frames in the current bit rate control unit.

S412: Allocate an intra frame bit rate according to one or more of: the total target bit rate, the intra/inter frame target bit rate ratio, a preset quantity of intra frames, and a preset quantity of inter frames. For example, allocate an intra frame bit rate according to each of the total target bit rate, the intra/inter frame target bit rate ratio, a preset quantity of intra frames, and a preset quantity of inter frames.

The quantity of intra frames and the quantity of inter frames of the current bit rate control unit may be preset and are expressed by using the following formula. The total target bit rate of the current bit rate control unit may be denoted as Size, the quantity of intra frames may be denoted as $Num_I$, the quantity of inter frames may be denoted as $Num_P$, and the intra/inter frame target bit rate ratio may be denoted as C.

$$Target_I = \frac{Size * C}{Num_I * C + Num_P}$$

In the intra frame bit rate allocation method, when the current frame of picture is the intra frame in the specified frame sequence, it may be separately assumed that the current frame of picture is an intra frame and an inter frame. The current frame of picture may be encoded into the intra frame and the inter frame in corresponding encoding manners. A corresponding intra frame encoding cost and a corresponding inter frame encoding cost may be calculated. A ratio of an intra frame target bit rate to an inter frame target bit rate may be determined according to a ratio of the intra frame encoding cost to the inter frame encoding cost, the ratio of the intra frame target bit rate to the inter frame target bit rate being positively correlated with the ratio of the intra frame encoding cost to the inter frame encoding cost; and an intra frame bit rate may be obtained through calculation according to the ratio of the intra frame target bit rate to the inter frame target bit rate. Generally, if motions in a video are intense and a correlation between pictures is relatively small, to reach video quality, a bit rate required by the inter frame is relatively high. Otherwise, for a relatively static video, a bit rate required by the inter frame is relatively low. Therefore, the ratio of the intra frame target bit rate to the inter frame target bit rate may be determined according to the ratio of the intra frame encoding cost to the inter frame encoding cost, so that the intra frame bit rate obtained through calculation according to the calculated ratio of the intra frame target bit rate to the inter frame target bit rate can reflect an actual scenario of a picture of the current frame of picture without being affected by bit rates and quantization parameters of a previous sequence GOP, so that accuracy of the assigned intra frame bit rate is high, thereby improving picture quality of video encoding.

Figure 5:
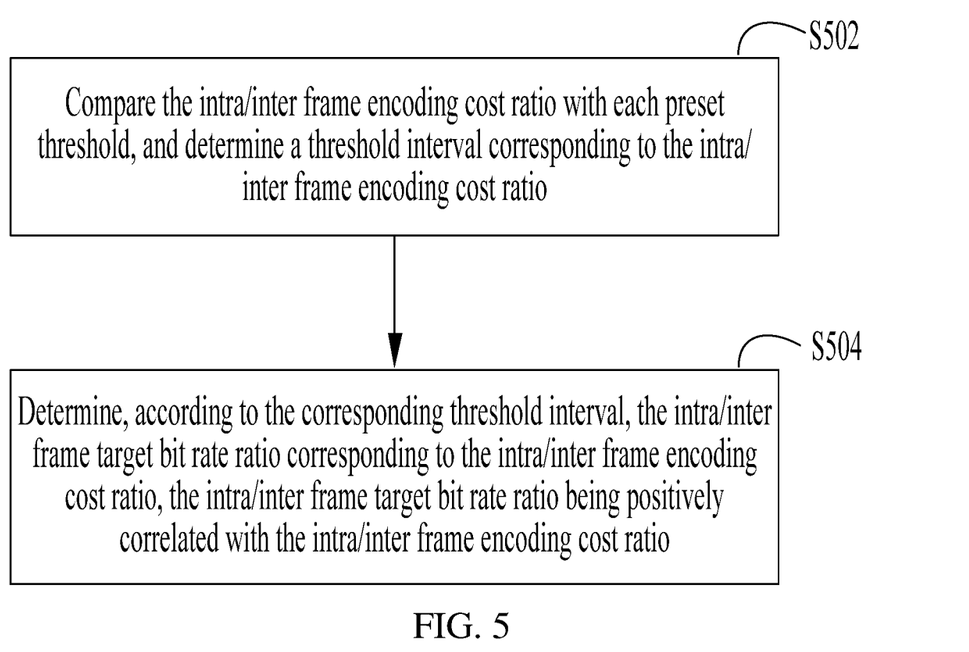
FIG. 5 is a schematic flowchart of determining an intra/inter frame target bit rate ratio according to an intra/inter frame encoding cost ratio in an embodiment.

In a specific embodiment, the determining an intra/inter frame target bit rate ratio according to the intra/inter frame encoding cost ratio may be specifically implemented by using a piecewise function. The intra/inter frame encoding cost ratio may be sectioned, and sections correspond to different intra/inter frame target bit rate ratios. Specifically, as shown in FIG. 5, the determining an intra/inter frame target bit rate ratio according to the intra/inter frame encoding cost ratio may include one or both of the following steps S502 and S504.

S502: Compare the intra/inter frame encoding cost ratio with each preset threshold and determine a threshold interval corresponding to the intra/inter frame encoding cost ratio.

S504: Determine, according to the corresponding threshold interval, the intra/inter frame target bit rate ratio corresponding to the intra/inter frame encoding cost ratio, the intra/inter frame target bit rate ratio being positively correlated with the intra/inter frame encoding cost ratio.

The thresholds $TH_1$, $TH_2$, . . . , $TH_j$ may be preset according to one or more of experience and compression efficiency. Each threshold may correspond to a threshold interval, and each threshold may be a boundary value of the threshold interval corresponding to the threshold. In an implementation, three thresholds are preset as follows according to the experience and the compression efficiency:

$$\begin{cases} TH_1 = 2 \\ TH_2 = 4 \\ TH_3 = 7 \end{cases}.$$

Correspondingly, each threshold may correspond to four threshold intervals, namely, $(-\infty, 1)$, $[2, 4)$, $[4, 7)$, and $[7, +\infty)$, and IP cos t may be compared with each preset threshold, to determine the threshold interval corresponding to the intra/inter frame encoding cost ratio.

A corresponding constant or function may be set for each threshold interval. The intra/inter frame target bit rate ratio corresponding to the intra/inter frame encoding cost ratio may be determined according to the threshold interval, and the intra/inter frame target bit rate ratio may be positively correlated with the intra/inter frame encoding cost ratio. That is, a higher intra/inter frame encoding cost ratio indicates a higher intra/inter frame target bit rate ratio. Otherwise, a lower intra/inter frame encoding cost ratio indicates a lower intra/inter frame target bit rate ratio. In an embodiment, the intra/inter frame target bit rate ratio is as follows:

$$C = \begin{cases} 2, & IPcost < TH_1 \\ 3, & TH_1 < IPcost < TH_2 \\ 4.5, & TH_2 < IPcost < TH_3 \\ 6, & IPcost > TH_3 \end{cases}.$$

In this embodiment, a corresponding constant may be set for each threshold interval. The intra/inter frame target bit rate ratio may be positively correlated with the intra/inter frame encoding cost ratio. Therefore, the constant within each threshold interval should be increased with an increase of the threshold. The threshold interval corresponding to the intra/inter frame encoding cost ratio may be determined. The constant corresponding to the threshold interval may be the intra/inter frame target bit rate ratio corresponding to the intra/inter frame encoding cost ratio.

In another implementation, a corresponding function used for calculating the intra/inter frame target bit rate ratio may be set for each threshold interval. The threshold interval corresponding to the intra/inter frame encoding cost ratio may be determined. The intra/inter frame target bit rate ratio corresponding to the intra/inter frame encoding cost ratio may be obtained based on the function corresponding to the threshold interval.

In the intra frame bit rate allocation method, the intra/inter frame encoding cost ratio may be divided into a plurality of intervals, the intervals correspond to different intra/inter frame target bit rate ratios, and different intervals may correspond to different video types, so that the intra frame bit rate can be adjusted for the different video types, thereby helping improve video compression efficiency and video encoding quality.

In still another embodiment, before the pre-encoding a current frame of picture when the current frame of picture is an intra frame in a specified frame sequence, the method may further include performing downsampling processing on a video picture with original resolution.

The downsampling is down-sampling or scaling down the picture. The downsampling processing may be performed on the video picture with the original resolution, so that the picture satisfies a size of a displayed area, and a thumbnail of the corresponding picture may be generated. The pre-encoding may be pre-encoding the current frame of picture obtained through the downsampling processing, thereby improving a pre-encoding speed.

In this embodiment, the downsampling may be performed by using different downsampling ratios (that is, a ratio of the original resolution to a target resolution). In an embodiment, when the downsampling ratio being Ds:1, it may be indicated that one pixel is, for example, sampled for every Ds pixel, where Ds is an integer greater than 1. In a specific implementation, the downsampling ratio may be 2:1. To be specific, if a length and a width of an original picture are respectively a and b, a length and a width of a picture obtained through the downsampling are respectively $$\frac{a}{2} \text{ and } \frac{b}{2}.$$

If the length and the width of the picture obtained through the downsampling are not integral multiples of N, sides of the picture obtained through the downsampling may be extended, to make the sides become integral multiples of N. N×N is an encoding block, which may be 4×4, 8×8, 16×16, and the like, during the pre-encoding.

Figure 6:
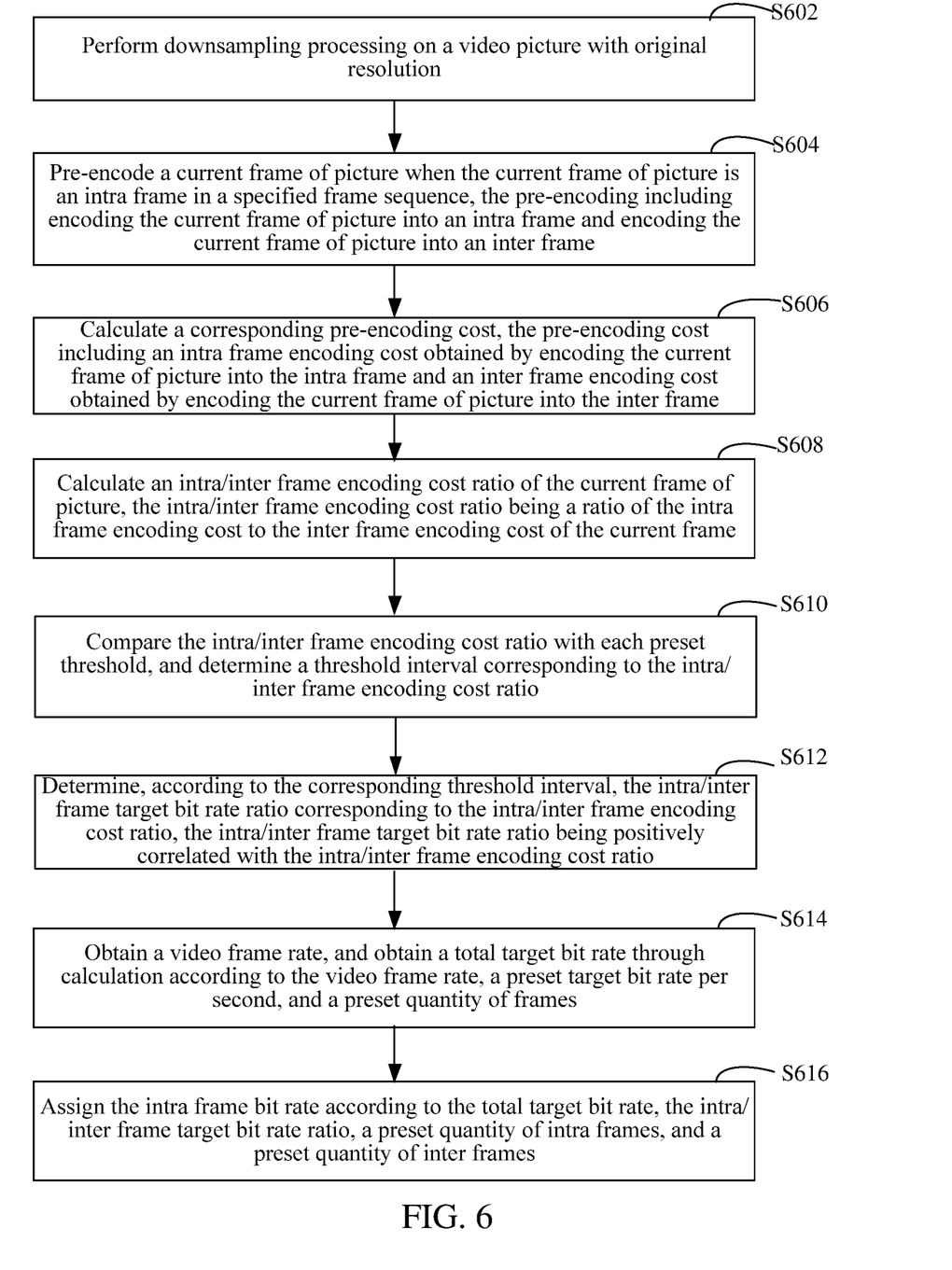
FIG. 6 is a schematic flowchart of an intra frame bit rate allocation method according to still another embodiment.

FIG. 6 is a schematic flowchart of an intra frame bit rate allocation method according to still another embodiment. As shown in FIG. 6, the method may include one or more or all of the following steps:

S602: Perform downsampling processing on a video picture with original resolution.

The downsampling is down-sampling or scaling down the picture. The downsampling processing may be performed on the video picture with the original resolution, so that the picture satisfies a size of a displayed area, and a thumbnail of the corresponding picture is generated. The pre-encoding may be pre-encoding the current frame of picture obtained through the downsampling processing, thereby improving a pre-encoding speed.

S604: Pre-encode a current frame of picture when the current frame of picture is an intra frame in a specified frame sequence, the pre-encoding including encoding the current frame of picture as an intra frame and an inter frame.

Specifically, when the current frame of picture is a set intra-frame encoded frame (a specified intra frame), it may be separately assumed that the current frame of picture is an intra frame image and an inter-coded frame and the current frame image may be encoded as an intra-coded frame and as an inter-coded frame by using corresponding coding manners. The current frame of picture may be encoded into the intra frame and the inter frame in corresponding encoding manners.

A pre-encoding process may be the same as an actual encoding process. In another implementation, the pre-encoding may alternatively simplify an encoding module and improve an encoding speed. For example, an encoding mode selection may be simplified. An optimal mode may be selected from nine encoding modes (e.g., in an HEVC mode, when encoding is performed in a normal frame, an optimal mode needs to be selected from 35 encoding modes).

S606: Calculate a corresponding pre-encoding cost, the pre-encoding cost may include an intra frame encoding cost obtained by encoding the current frame of picture into the intra frame and an inter frame encoding cost obtained by encoding the current frame of picture into the inter frame.

A formula for calculating the corresponding pre-encoding cost may be: cost=D+λR, where cost is the encoding cost, D indicates a distortion degree of a picture encoding block corresponding to an encoding unit, D may be obtained by using an absolute difference and a sum of absolute difference (SAD) operation, λ is a Lagrange constant, and R indicates a quantity of bits occupied by the picture encoding block corresponding to the encoding unit. In another implementation, the encoding cost may alternatively be indicated by using only D, that is, cost=D. In another implementation, the encoding cost may alternatively be estimated according to a prediction residual.

A higher intra frame encoding cost obtained through calculation indicates a higher bit rate that is required for reaching same video quality, if the current frame of picture is the intra frame. Otherwise, lower intra frame encoding cost obtained through calculation indicates a lower bit rate that is required for reaching same video quality, if the current frame of picture is the intra frame.

A higher intra frame encoding cost obtained through calculation indicates a higher bit rate that is required for reaching same video quality, if the current frame of picture is the intra frame. Otherwise, lower intra frame encoding cost obtained through calculation indicates a lower bit rate that is required for reaching same video quality, if the current frame of picture is the intra frame.

S608: Calculate an intra/inter frame encoding cost ratio of the current frame of picture, the intra/inter frame encoding cost ratio being a ratio of the intra frame encoding cost to the inter frame encoding cost of the current frame of picture.

Generally, if motions in a video are intense and a correlation between pictures is relatively small, to reach video quality, a bit rate required by the inter frame is relatively high. Otherwise, for a relatively static video, a bit rate required by the inter frame is relatively low.

The intra/inter frame encoding cost ratio of the current frame of picture may be analyzed. The ratio is equal to the intra frame encoding cost divided by the inter frame encoding cost. If the intra/inter frame encoding cost ratio is low, it indicates that the inter frame may need a higher bit rate, so that in a same target bit rate, a relatively low bit rate should be assigned to the intra frame. Otherwise, if the intra/inter frame encoding cost ratio is high, a relatively high bit rate is assigned to the intra frame. The intra frame encoding cost is denoted as I cos t, the inter frame encoding cost is denoted as P cos t, and the ratio of the intra frame encoding cost to the inter frame encoding cost is denoted as IP cos t, so that the formula may be expressed as:

$$IP\text{cos}t = \frac{I\text{cos}t}{P\text{cos}t}.$$

S610: Compare the intra/inter frame encoding cost ratio with each preset threshold and determine a threshold interval corresponding to the intra/inter frame encoding cost ratio.

S612: Determine, according to the corresponding threshold interval, the intra/inter frame target bit rate ratio corresponding to the intra/inter frame encoding cost ratio, the intra/inter frame target bit rate ratio being positively correlated with the intra/inter frame encoding cost ratio.

The thresholds $TH_1, TH_2, \ldots, TH_j$ are preset according to experience and compression efficiency. Each threshold corresponds to a threshold interval, and each threshold is a boundary value of the threshold interval corresponding to the threshold. IP cos t is compared with each preset threshold, to determine the threshold interval corresponding to the intra/inter frame encoding cost ratio.

A corresponding constant or function may be set for each threshold interval. The intra/inter frame target bit rate ratio corresponding to the intra/inter frame encoding cost ratio may be determined according to the threshold interval, and the intra/inter frame target bit rate ratio may be positively correlated with the intra/inter frame encoding cost ratio. That is, a higher intra/inter frame encoding cost ratio indicates a higher intra/inter frame target bit rate ratio. Otherwise, a lower intra/inter frame encoding cost ratio indicates a lower intra/inter frame target bit rate ratio.

S614: Obtain a video frame rate and obtain a total target bit rate through calculation according to the video frame rate, a preset target bit rate per second, and a preset quantity of frames.

The frame rate is a metric used for measuring a quantity of displayed frames, that is, a quantity of pictures per second. The frame rate may be determined through video sampling. The target bit rate per second and the quantity of frames are preset. The total target bit rate of a current bit rate control unit is equal to the target bit rate per second divided by the frame rate and then multiplied by the quantity of frames in the current bit rate control unit.

S616: Assign the intra frame bit rate according to the total target bit rate, the intra/inter frame target bit rate ratio, a preset quantity of intra frames, and a preset quantity of inter frames.

The quantity of intra frames and the quantity of inter frames of the current bit rate control unit are preset and are expressed by using the following formula. The total target bit rate of the current bit rate control unit is denoted as Size, the quantity of intra frames is denoted as $Num_I$, the quantity of inter frames is denoted as $Num_P$, and the intra/inter frame target bit rate ratio is denoted as C.

$$Target_I = \frac{Size * C}{Num_I * C + Num_P}$$

In the intra frame bit rate allocation method, the intra/inter frame encoding cost ratio is divided into a plurality of intervals, the intervals correspond to different intra/inter frame target bit rate ratios, and different intervals may correspond to different video types, so that the intra frame bit rate can be adjusted for the different video types, thereby helping improve video compression efficiency and video encoding quality. In addition, the assigned intra frame bit rate is not affected by bit rates and quantization parameters of a previous sequence GOP, so that accuracy of the assigned intra frame bit rate is high, thereby improving picture quality of video encoding.

In an embodiment, a computer device is further provided. An inner structure of the computer device may be shown in FIG. 2. The computer device may include an intra frame bit rate allocation apparatus. The intra frame bit rate allocation apparatus may include functional modules, and a part or all of each module may be implemented by using software, hardware (e.g., one or more hardware processor), or a combination thereof.

Figure 7:
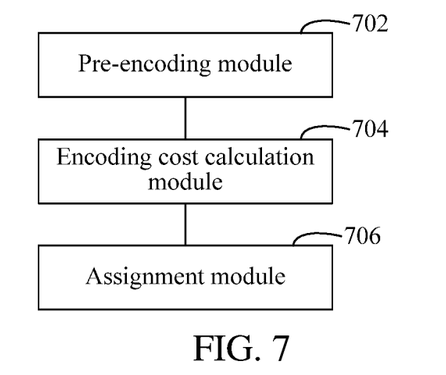
FIG. 7 is a structural block diagram of an intra frame bit rate allocation apparatus according to an embodiment.

FIG. 7 is a schematic structural diagram of an intra frame bit rate allocation apparatus. As shown in FIG. 7, the intra frame bit rate allocation apparatus may include one or more of a pre-encoding module 702, an encoding cost calculation module 704, and an allocation module 706.

The pre-encoding module 702 may be configured to pre-encode a current frame of picture when the current frame of picture is an intra frame in a specified frame sequence. The pre-encoding includes encoding the current frame of picture into an intra frame.

The encoding cost calculation module 704 may be configured to calculate a corresponding pre-encoding cost.

The allocation module 706 may be configured to assign an intra frame bit rate according to the pre-encoding cost. The assigned intra frame bit rate may be positively correlated with the pre-encoding cost.

In the foregoing intra frame bit rate allocation apparatus, the pre-encoding cost may be obtained by pre-encoding the current frame of picture, and the pre-encoding may include encoding the current frame of picture into the intra frame. If the pre-encoding cost is high, it indicates that a bit rate required by the intra frame for reaching same video quality is high, or if the pre-encoding cost is low, it indicates that a bit rate required by the intra frame bit rate for reaching same video quality is low. Therefore, the intra frame bit rate assigned according to the pre-encoding cost can reflect an actual scenario of a picture of the current frame of picture without being affected by bit rates and quantization parameters of a previous sequence GOP, so that accuracy of the assigned intra frame bit rate is high, thereby improving picture quality of video encoding.

In another embodiment, the pre-encoding further may further include encoding the current frame of picture into an inter frame. The pre-encoding cost may include an intra frame encoding cost obtained by encoding the current frame of picture into the intra frame and an inter frame encoding cost obtained by encoding the current frame of picture into the inter frame.

Figure 8:
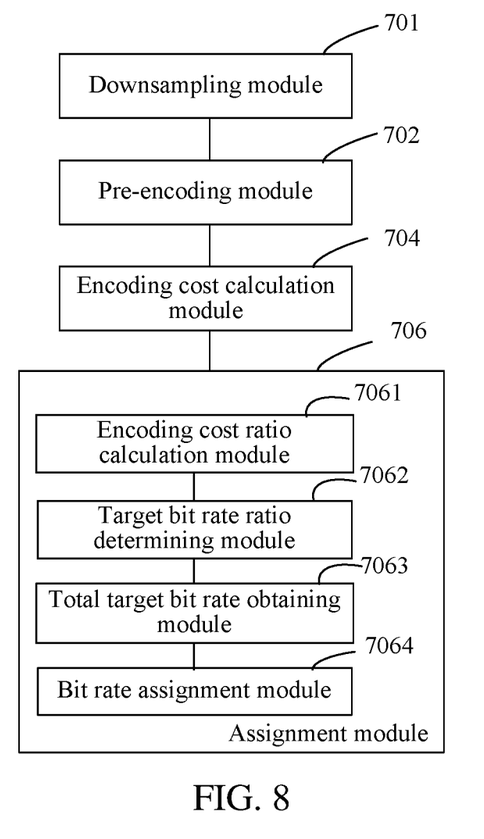
FIG. 8 is a structural block diagram of an intra frame bit rate allocation apparatus according to still another embodiment.

As shown in FIG. 8, the allocation module 706 may include one or more or all of: an encoding cost ratio calculation module 7061, a target bit rate ratio determining module 7062, a total target bit rate obtaining module 7063, and a bit rate allocation module 7064.

The encoding cost ratio calculation module 7061 may be configured to calculate an intra/inter frame encoding cost ratio of the current frame of picture. The intra/inter frame encoding cost ratio may be a ratio of the intra frame encoding cost to the inter frame encoding cost of the current frame of picture.

The target bit rate ratio determining module 7062 may be configured to determine an intra/inter frame target bit rate ratio according to the intra/inter frame encoding cost ratio. The intra/inter frame target bit rate ratio is a ratio of an intra frame target bit rate to an inter frame target bit rate, and the intra/inter frame target bit rate ratio may be positively correlated with the intra/inter frame encoding cost ratio.

Specifically, the target bit rate ratio determining module 7062 may be configured to: compare the intra/inter frame encoding cost ratio with each preset threshold, determine a threshold interval corresponding to the intra/inter frame encoding cost ratio, and determine, according to the corresponding threshold interval, the intra/inter frame target bit rate ratio corresponding to the intra/inter frame encoding cost ratio. The intra/inter frame target bit rate ratio may be positively correlated with the intra/inter frame encoding cost ratio.

The total target bit rate obtaining module 7063 may be configured to obtain a video frame rate.

Specifically, the total target bit rate obtaining module 7063 may be configured to: obtain a video frame rate; and obtain the total target bit rate through calculation according to the video frame rate, a preset target bit rate per second, and a quantity of frames.

The bit rate allocation module 7064 may be configured to assign the intra frame bit rate according to one or more of the total target bit rate, the intra/inter frame target bit rate ratio, a preset quantity of intra frames, and a preset quantity of inter frames.

In the intra frame bit rate allocation apparatus, when the current frame of picture is the intra frame in the specified frame sequence, it may be separately assumed that the current frame of picture is an intra frame and an inter frame. The current frame of picture may be encoded into the intra frame and the inter frame in corresponding encoding manners. A corresponding intra frame encoding cost and a corresponding inter frame encoding cost may be calculated, a ratio of an intra frame target bit rate to an inter frame target bit rate may be determined according to a ratio of the intra frame encoding cost to the inter frame encoding cost, the ratio of the intra frame target bit rate to the inter frame target bit rate being positively correlated with the ratio of the intra frame encoding cost to the inter frame encoding cost, and an intra frame bit rate may be obtained through calculation according to the ratio of the intra frame target bit rate to the inter frame target bit rate. Generally, if motions in a video are intense and a correlation between pictures is relatively small, to reach video quality, a bit rate required by the inter frame is relatively high. Otherwise, for a relatively static video, a bit rate required by the inter frame is relatively low. Therefore, the ratio of the intra frame target bit rate to the inter frame target bit rate may be determined according to the ratio of the intra frame encoding cost to the inter frame encoding cost, so that the intra frame bit rate obtained through calculation according to the calculated ratio of the intra frame target bit rate to the inter frame target bit rate can reflect an actual scenario of a picture of the current frame of picture without being affected by bit rates and quantization parameters of a previous sequence GOP, so that accuracy of the assigned intra frame bit rate is high, thereby improving picture quality of video encoding.

In another embodiment, referring to FIG. 8, the intra frame bit rate allocation apparatus may include: a downsampling module 701, configured to perform downsampling processing on a video picture with original resolution. The pre-encoding module 702 may pre-encode the current frame of picture obtained through the downsampling processing.

The downsampling is down-sampling or scaling down the picture. The downsampling processing may be performed on the video picture with the original resolution, so that the picture satisfies a size of a displayed area, and a thumbnail of the corresponding picture is generated. The pre-encoding may be pre-encoding the current frame of picture obtained through the downsampling processing, thereby improving a pre-encoding speed.

Although the steps in the embodiments of this application are not necessarily performed in an order indicated by the step numbers. Unless otherwise explicitly stated in this specification, these steps are not performed in a strictly limited order, and the steps may be performed in other orders. In addition, at least some of the steps in the embodiments may include a plurality of sub-steps or a plurality of stages. These sub-steps or stages are not necessarily performed at a same moment, but may be performed at different moments. These sub-steps or stages are not necessarily performed sequentially, but may be performed by turns or alternately with other steps or at least some sub-steps or stages of other steps.

A person of ordinary skill in the art may understand that all or some of the procedures of the methods in the foregoing embodiments may be implemented by a computer program instructing relevant hardware (e.g., one or more hardware processors). The computer program may be stored in a non-volatile computer readable storage medium. When the program is run, the procedures of the foregoing methods in the embodiments are performed. Any reference to a memory, storage, a database, or other mediums used in the embodiments provided in this application can include a non-volatile memory and/or a volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus (Rambus) direct RAM (RDRAM), a direct rambus dynamic RAM (DRDRAM), and a rambus dynamic RAM (RDRAM).

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only show several implementations of this application and are described in detail, but they should not be construed as a limitation to the patent scope of this application. It should be noted that various changes and improvements may further be made by a person of ordinary skill in the art without departing from the idea of this application, and these changes and improvements all fall within the protection scope of this application. Therefore, the protection scope of the patent of this application shall be subject to the appended claims.

What is claimed is:

1. A method for intra frame bit rate allocation being performed by a computer device comprising at least one processor, the method comprising:

pre-encoding, by the computer device, a current frame of picture that is an intra frame in a specified frame sequence, the pre-encoding comprising encoding the current frame of picture as the intra frame and encoding the current frame of picture as an inter frame by assuming that the current frame of picture, which is the intra frame, as the inter frame;

calculating, by the computer device, an intra frame encoding cost and an inter frame encoding cost of the pre-encoding;

calculating, by the computer device, an intra/inter frame encoding cost ratio of the current frame of picture, the intra/inter frame encoding cost ratio being a ratio of the intra frame encoding cost to the inter frame encoding cost of the current frame of picture;

determining, by the computer device, an intra/inter frame target bit rate ratio according to the intra/inter frame encoding cost ratio, the intra/inter frame target bit rate ratio being a ratio of a preset intra frame target bit rate to a preset inter frame target bit rate, and the intra/inter frame target bit rate ratio being positively correlated with the intra/inter frame encoding cost ratio;

obtaining, by the computer device, a total target bit rate corresponding to a quantity of frames in a current bit rate control unit; and allocating, by the computer device, an intra frame bit rate according to the total target bit rate, the intra/inter frame target bit rate ratio, and a preset quantity of intra frames and a preset quantity of inter frames of the current bit rate control unit.

2. The method according to claim 1, wherein the calculating the intra frame encoding cost and the inter frame encoding cost of the pre-encoding comprises:

obtaining the intra frame encoding cost by encoding the current frame of picture as the intra frame and obtaining the inter frame encoding cost by encoding the current frame of picture as the inter frame.

3. The method according to claim 2, wherein the calculating, by the computer device, the intra frame encoding cost and the inter frame encoding cost of the pre-encoding comprises:

calculating the intra frame encoding cost or the inter frame encoding cost according to a formula: cost=D+ λR, where cost is an encoding cost, D indicates a distortion degree of a picture encoding block corresponding to an encoding unit, D may be obtained by using an absolute difference and a sum of absolute difference (SAD) operation, λ is a Lagrange constant, and R indicates a quantity of bits occupied by the picture encoding block corresponding to the encoding unit.

4. The method according to claim 1, wherein the determining, by the computer device, the intra/inter frame target bit rate ratio according to the intra/inter frame encoding cost ratio comprises:

comparing, by the computer device, the intra/inter frame encoding cost ratio with each preset threshold, and determining a threshold time interval corresponding to the intra/inter frame encoding cost ratio; and determining, by the computer device, according to the threshold time interval, the intra/inter frame target bit rate ratio corresponding to the intra/inter frame encoding cost ratio, the intra/inter frame target bit rate ratio being positively correlated with the intra/inter frame encoding cost ratio.

5. The method according to claim 1, wherein the obtaining, by the computer device, the total target bit rate comprises:

obtaining, by the computer device, a video frame rate; and obtaining, by the computer device, the total target bit rate through calculation according to the video frame rate, a preset target bit rate per second, and a preset quantity of frames in the current bit rate control unit.

6. The method according to claim 1, wherein the allocating, by the computer device, the intra frame bit rate comprises:

calculating the intra frame bit rate according to a formula of $$Target_I = \frac{Size * C}{Num_I * C + Num_P}$$

where Size is the total target bit rate of the current bit rate control unit, $Num_I$ is the preset quantity of intra frames, $Num_P$ is the preset quantity of inter frames of the current bit rate control unit, and C is the intra/inter frame target bit rate ratio.

7. The method according to claim 1, further comprising:

performing, by the computer device, downsampling processing on a video picture with original resolution, wherein the pre-encoding includes pre-encoding the current frame of picture obtained through the downsampling processing.

8. The method according to claim 1, wherein the obtaining, by the computer device, the total target bit rate comprises:

obtaining, by the computer device, a video frame rate; and obtaining, by the computer device, the total target bit rate a first value obtained by dividing a preset target bit rate per second by the video frame rate, and multiplying the first value by a preset quantity of frames in the current bit rate control unit.

9. A computer device comprising:

at least one memory configured to store computer program code; and at least one processor configured to access the at least one memory and operate according to the computer program code, the computer program code comprising:

pre-encoding code configured to cause the at least one processor to perform pre-encoding a current frame of picture that is an intra frame in a specified frame sequence, the pre-encoding comprising encoding the current frame of picture as the intra frame and encoding the current frame of picture as an inter frame by assuming that the current frame of picture, which is the intra frame, as the inter frame;

cost calculating code configured to cause the at least one processor to calculate an intra frame encoding cost and an inter frame encoding cost of the pre-encoding;

cost ratio calculating code configured to cause the at least one processor to calculate an intra/inter frame encoding cost ratio of the current frame of picture, the intra/inter frame encoding cost ratio being a ratio of the intra frame encoding cost to the inter frame encoding cost of the current frame of picture; and determining code configured to cause the at least one processor to determine an intra/inter frame target bit rate ratio according to the intra/inter frame encoding cost ratio, the intra/inter frame target bit rate ratio being a ratio of a preset intra frame target bit rate to a preset inter frame target bit rate, and the intra/inter frame target bit rate ratio being positively correlated with the intra/inter frame encoding cost ratio; and allocating code configured to cause the at least one processor to obtain a total target bit rate corresponding to a quantity of frames in a current bit rate control unit; and allocate an intra frame bit rate according to the total target bit rate, the intra/inter frame target bit rate ratio, and a preset quantity of intra frames and a preset quantity of inter frames of the current bit rate control unit.

10. The computer device according to claim 9, wherein the cost ratio calculating code is configured to cause the at least one processor to obtain the intra frame encoding cost by encoding the current frame of picture as the intra frame and obtain the inter frame encoding cost by encoding the current frame of picture as the inter frame.

11. The computer device according to claim 9, wherein the determining code comprises:

comparing sub-code configured to cause the at least one processor to compare the intra/inter frame encoding cost ratio with each preset threshold, and determine a threshold time interval corresponding to the intra/inter frame encoding cost ratio; and determining sub-code configured to cause the at least one processor to determine, according to the threshold time interval, the intra/inter frame target bit rate ratio corresponding to the intra/inter frame encoding cost ratio, the intra/inter frame target bit rate ratio being positively correlated with the intra/inter frame encoding cost ratio.

12. The computer device according to claim 9, wherein the allocating code is configured to cause the at least one processor to:

obtain a video frame rate; and obtain the total target bit rate through calculation according to the video frame rate, a preset target bit rate per second, and a preset quantity of frames.

13. The computer device according to claim 9, wherein the computer program code further comprises:

downsampling processing code configured to cause the at least one processor to perform downsampling processing on a video picture with original resolution, wherein the pre-encoding includes pre-encoding the current frame of picture obtained through the downsampling processing.

14. A non-transitory computer-readable storage medium storing instructions that cause at least one processor to:

pre-encode a current frame of picture that is an intra frame in a specified frame sequence, the pre-encoding comprising encoding the current frame of picture as the intra frame and encoding the current frame of picture as an inter frame by assuming that the current frame of picture, which is the intra frame, as the inter frame;

calculate an intra frame encoding cost and an inter frame encoding cost of the pre-encoding;

calculate an intra/inter frame encoding cost ratio of the current frame of picture, the intra/inter frame encoding cost ratio being a ratio of the intra frame encoding cost to the inter frame encoding cost of the current frame of picture;

determine an intra/inter frame target bit rate ratio according to the intra/inter frame encoding cost ratio, the intra/inter frame target bit rate ratio being a ratio of a preset intra frame target bit rate to a preset inter frame target bit rate, and the intra/inter frame target bit rate ratio being positively correlated with the intra/inter frame encoding cost ratio;

obtain a total target bit rate corresponding to a quantity of frames in a current bit rate control unit; and allocate an intra frame bit rate according to the total target bit rate, the intra/inter frame target bit rate ratio, and a preset quantity of intra frames and a preset quantity of inter frames of the current bit rate control unit.

15. The non-transitory computer-readable storage medium according to claim 14, wherein the calculating the intra frame encoding cost and the inter frame encoding cost of the pre-encoding comprises:

obtaining the intra frame encoding cost by encoding the current frame of picture as the intra frame and obtaining the inter frame encoding cost by encoding the current frame of picture as the inter frame.

16. The non-transitory computer-readable storage medium according to claim 14, wherein the determining the intra/inter frame target bit rate ratio according to the intra/inter frame encoding cost ratio comprises:

comparing the intra/inter frame encoding cost ratio with each preset threshold, and determining a threshold time interval corresponding to the intra/inter frame encoding cost ratio; and determining, according to the threshold time interval, the intra/inter frame target bit rate ratio corresponding to the intra/inter frame encoding cost ratio, the intra/inter frame target bit rate ratio being positively correlated with the intra/inter frame encoding cost ratio.

* * * * *